United States Patent Office 3,451,756
Patented June 24, 1969

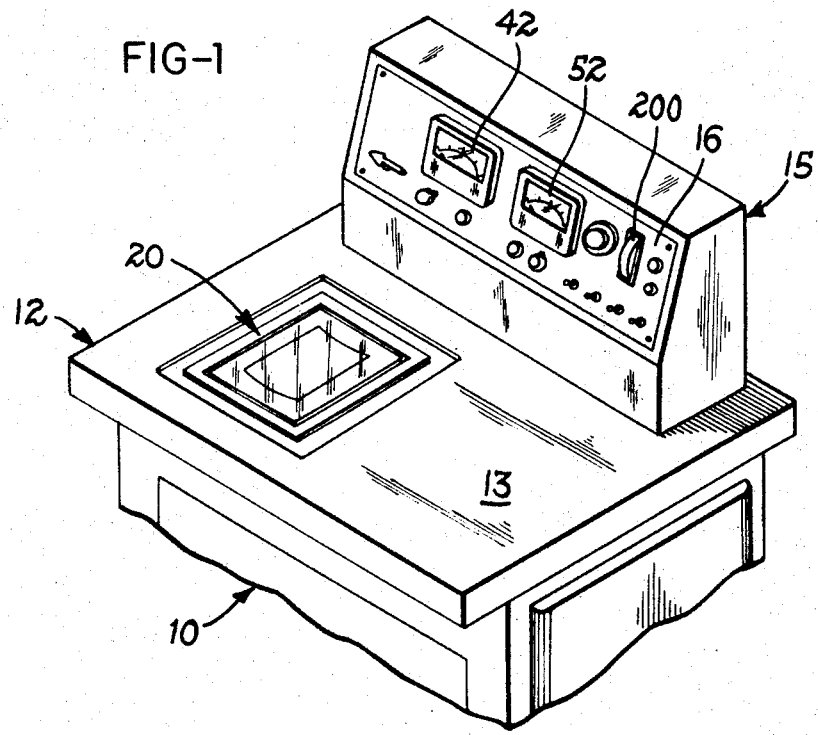
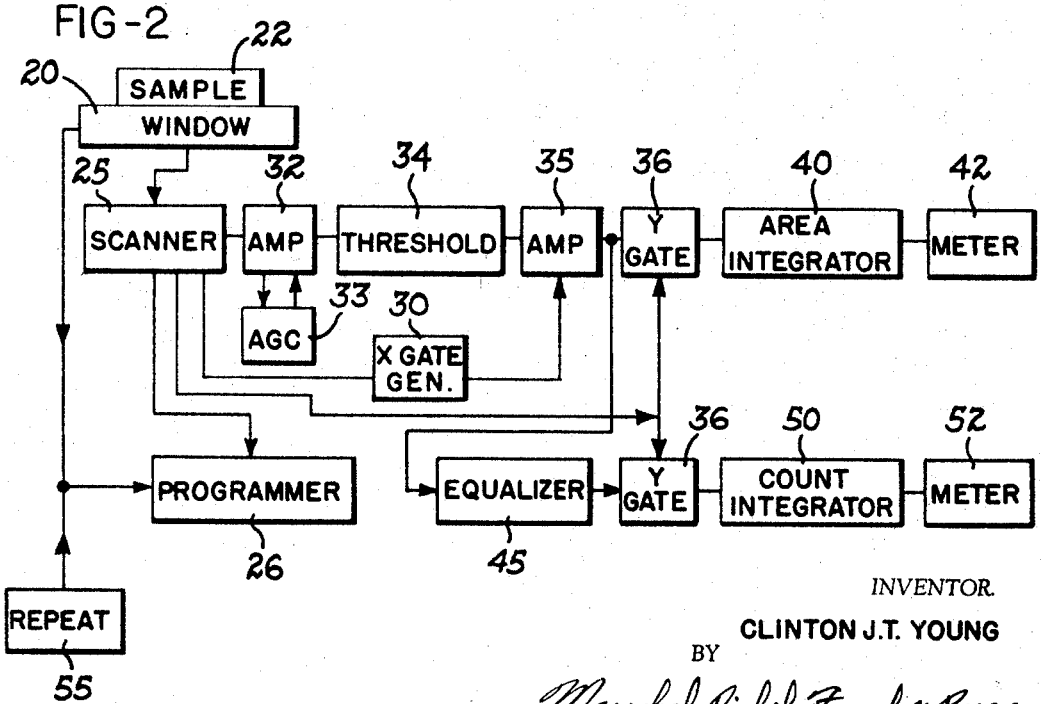

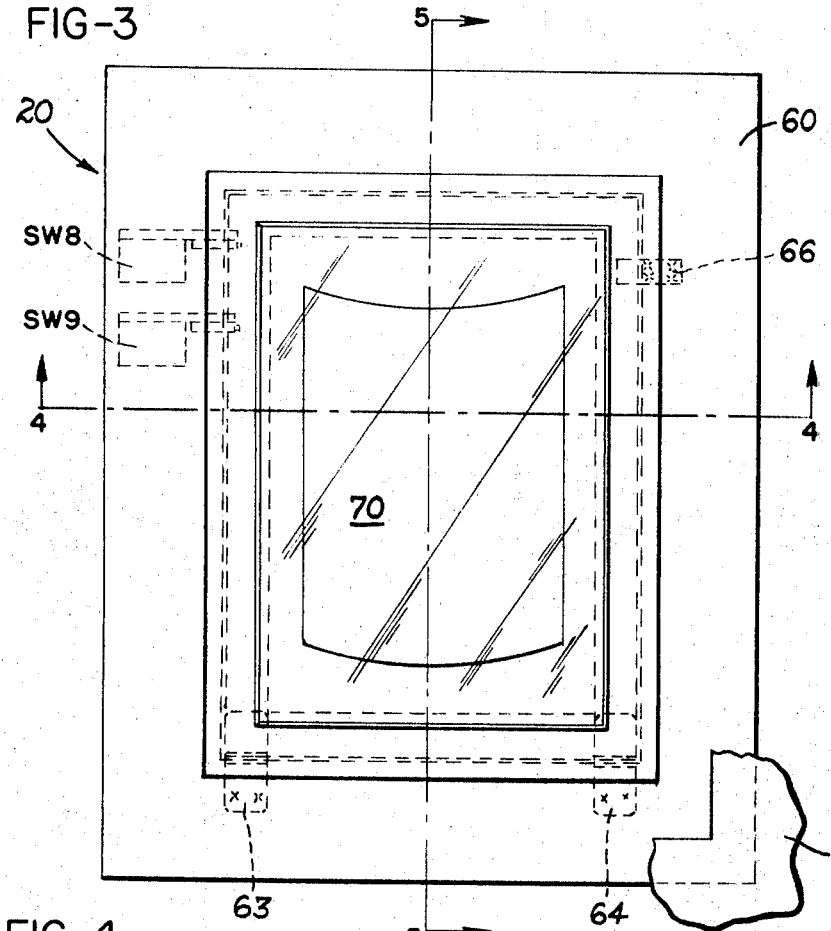
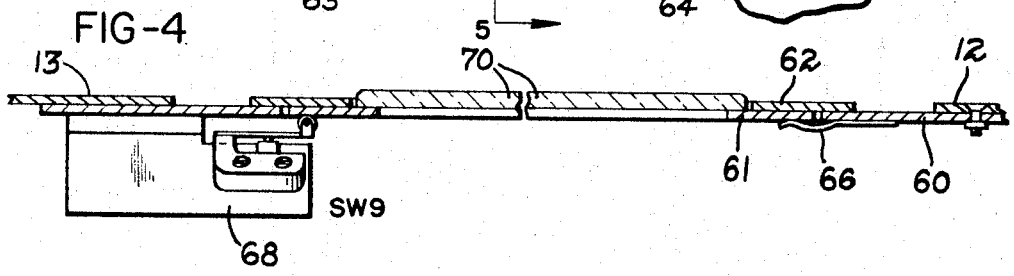
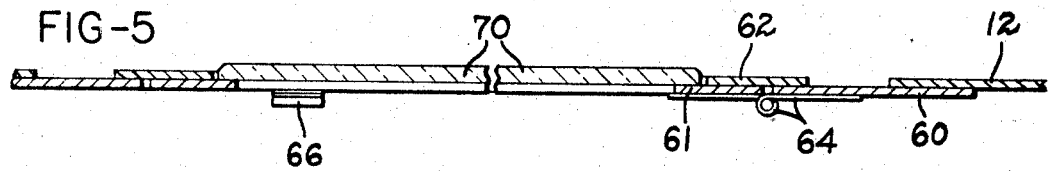

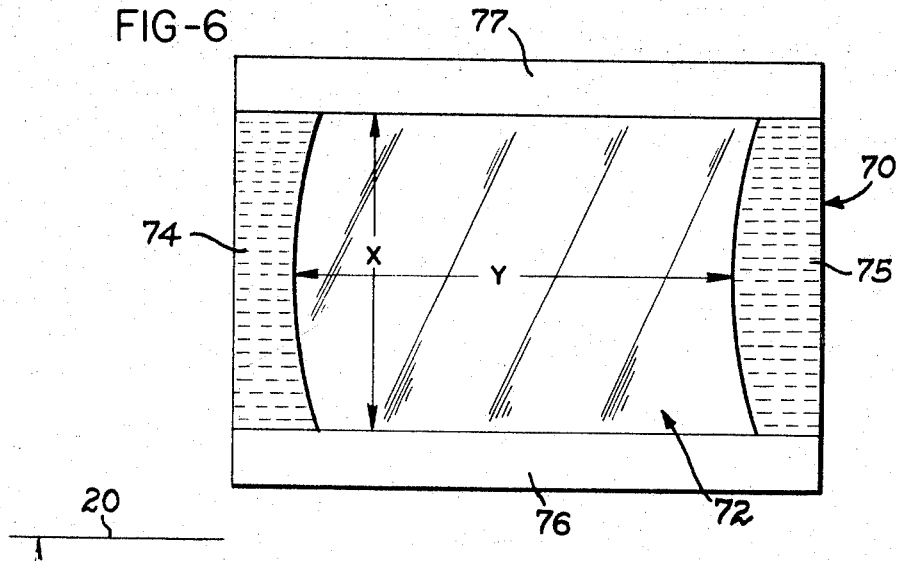
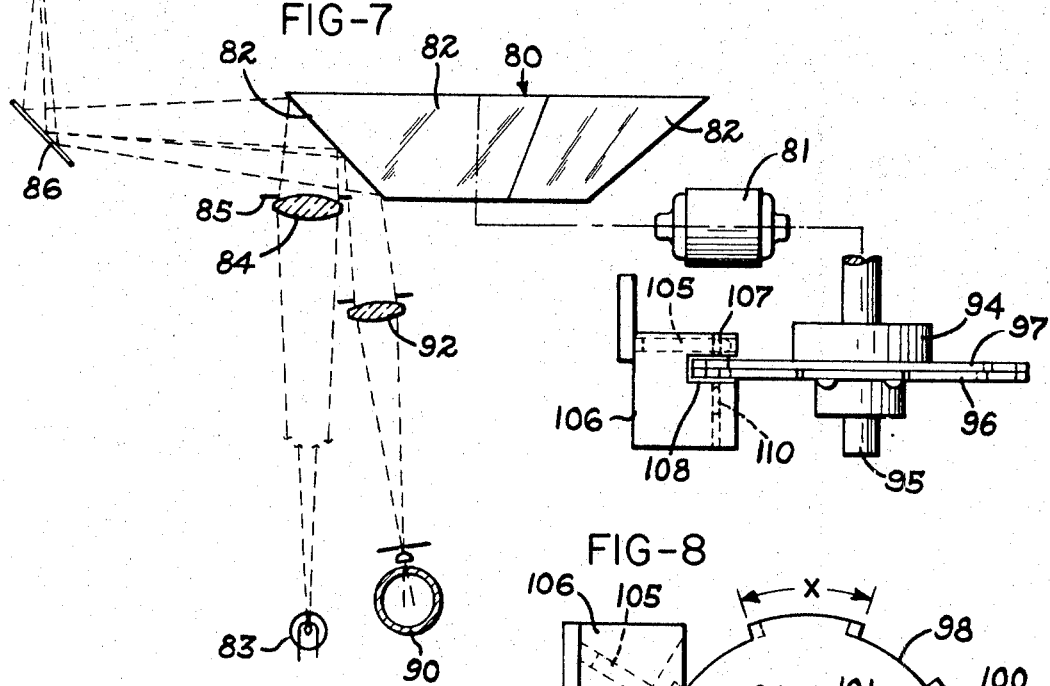
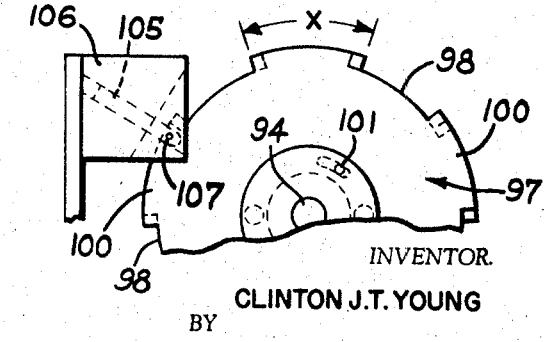
INVENTOR.
CLINTON J.T. YOUNG

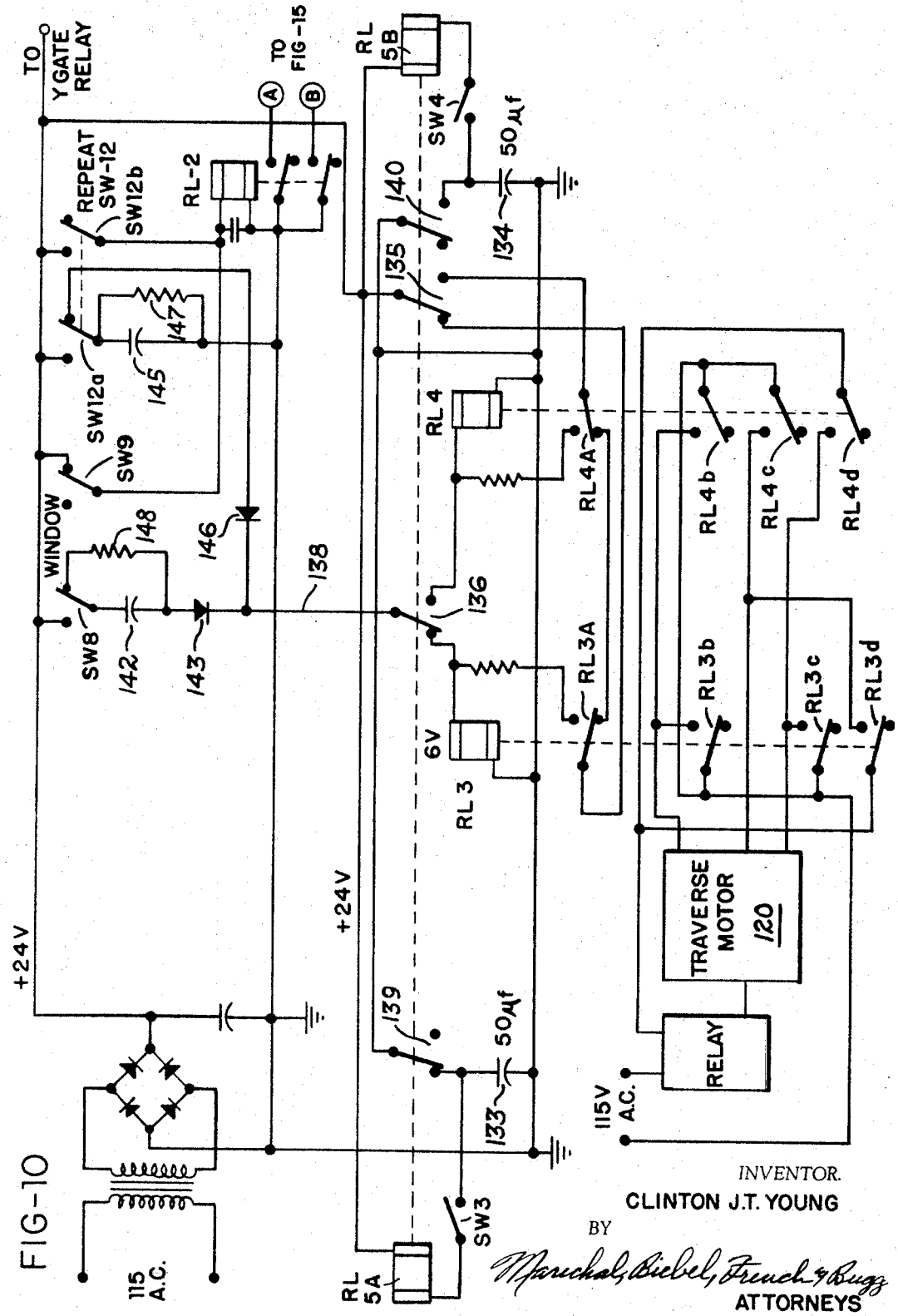

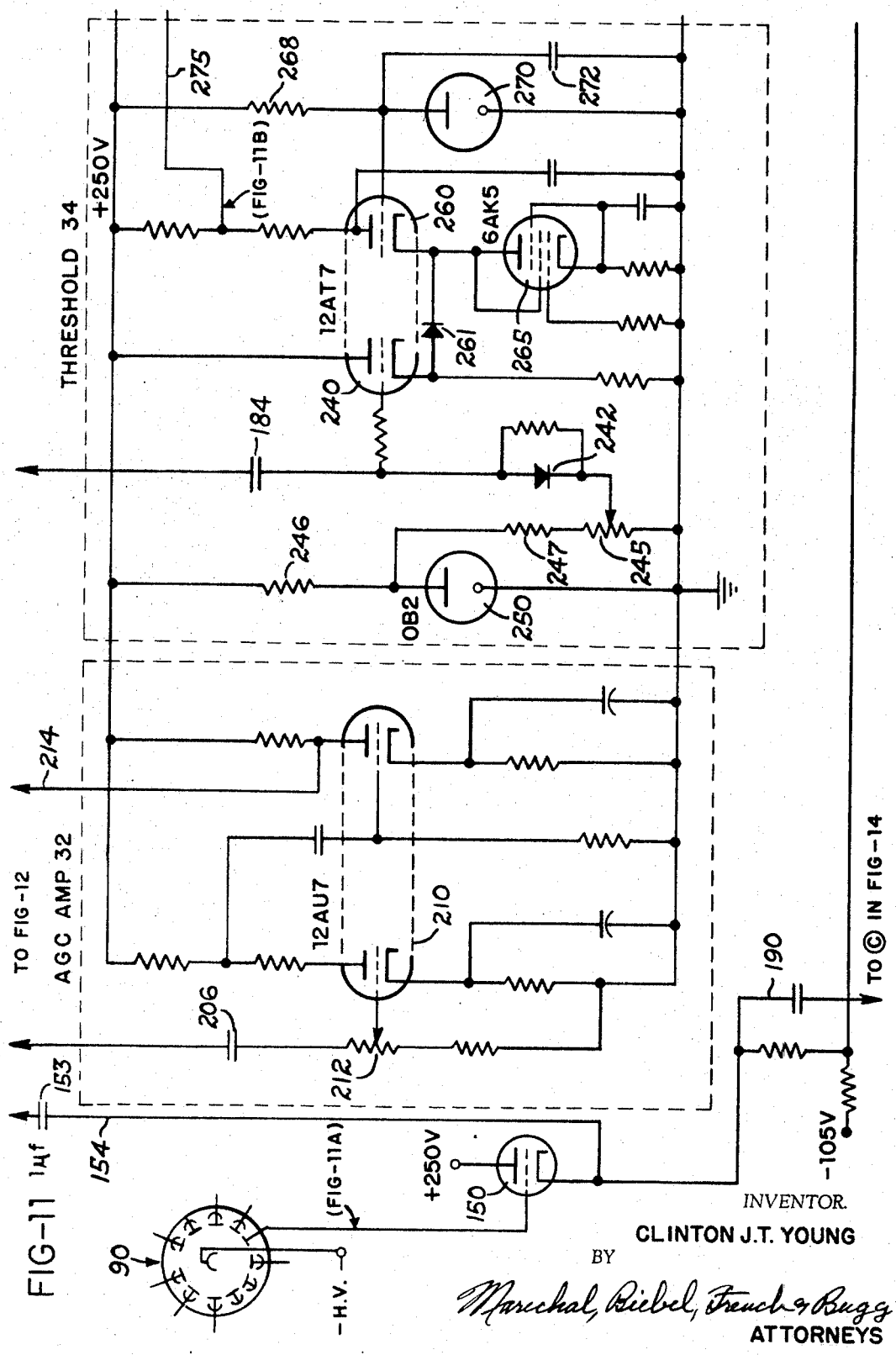

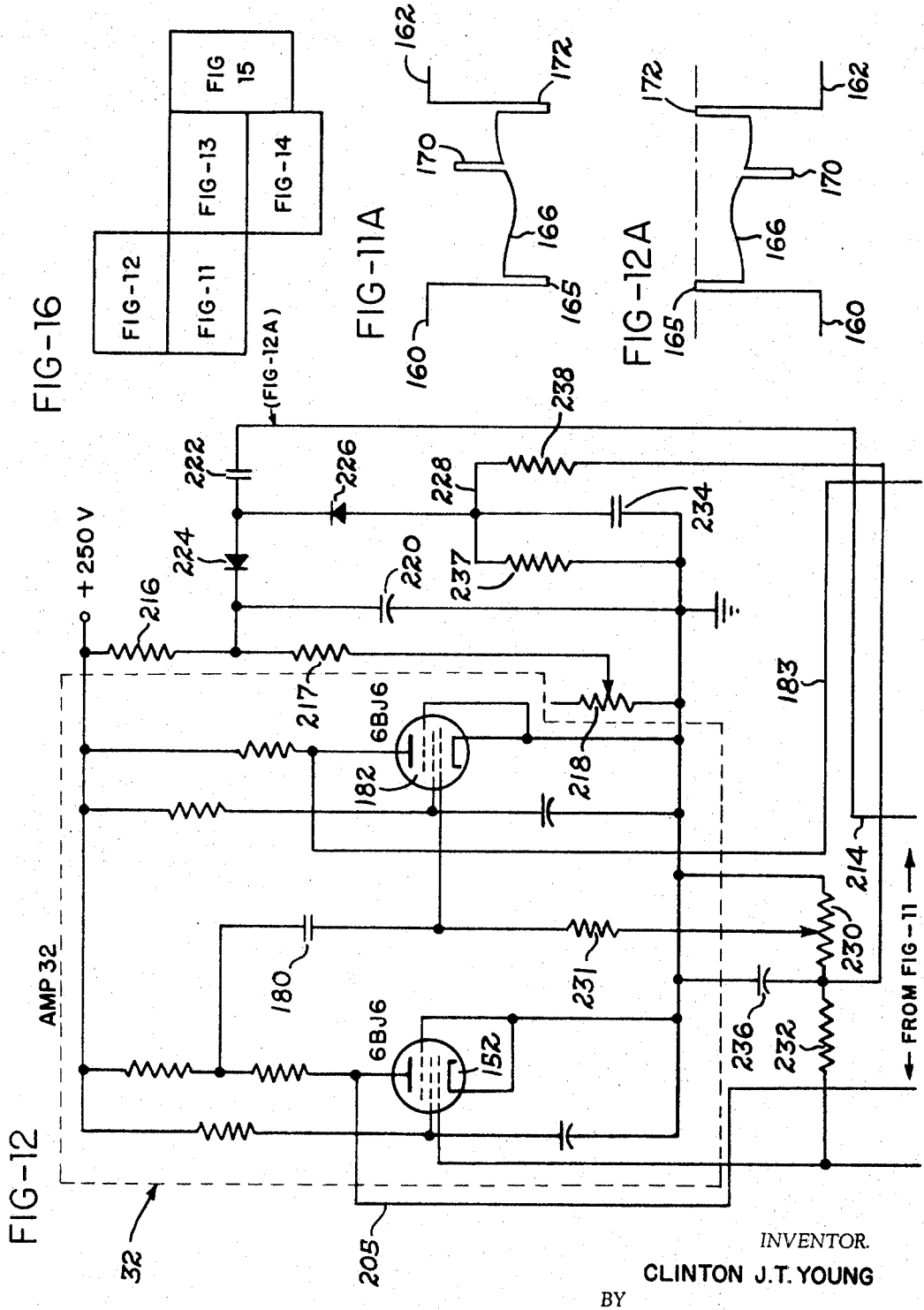

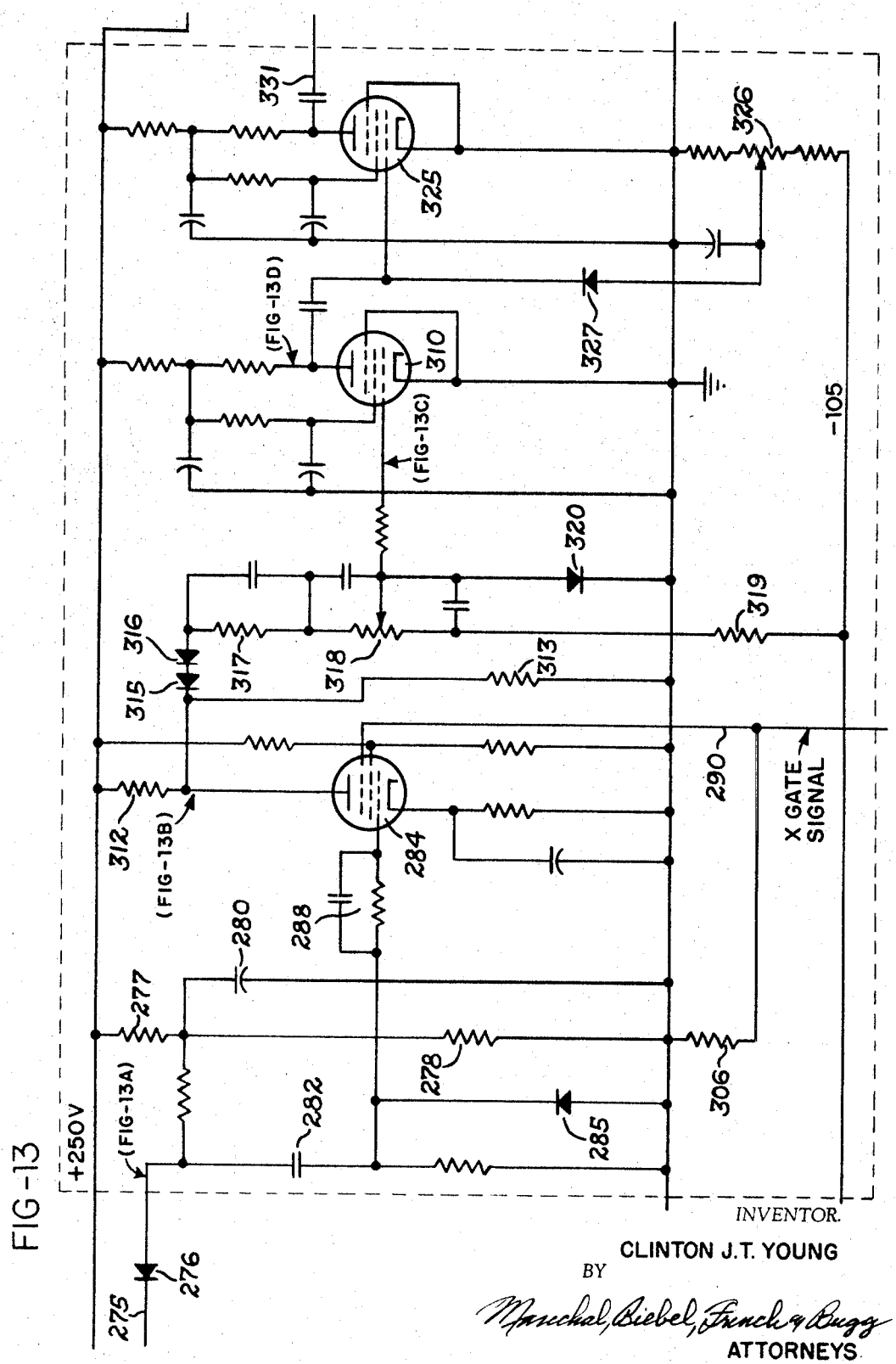

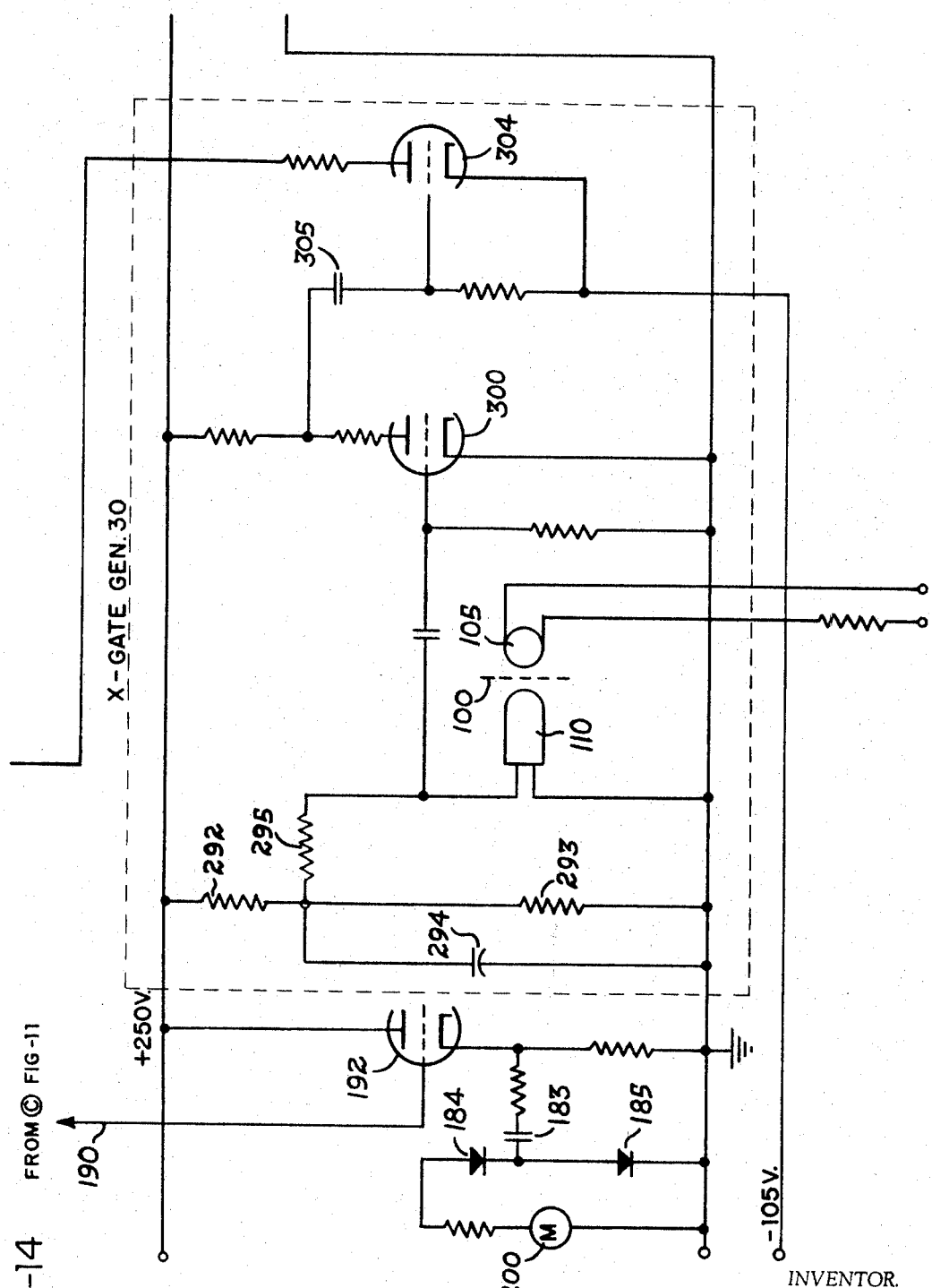

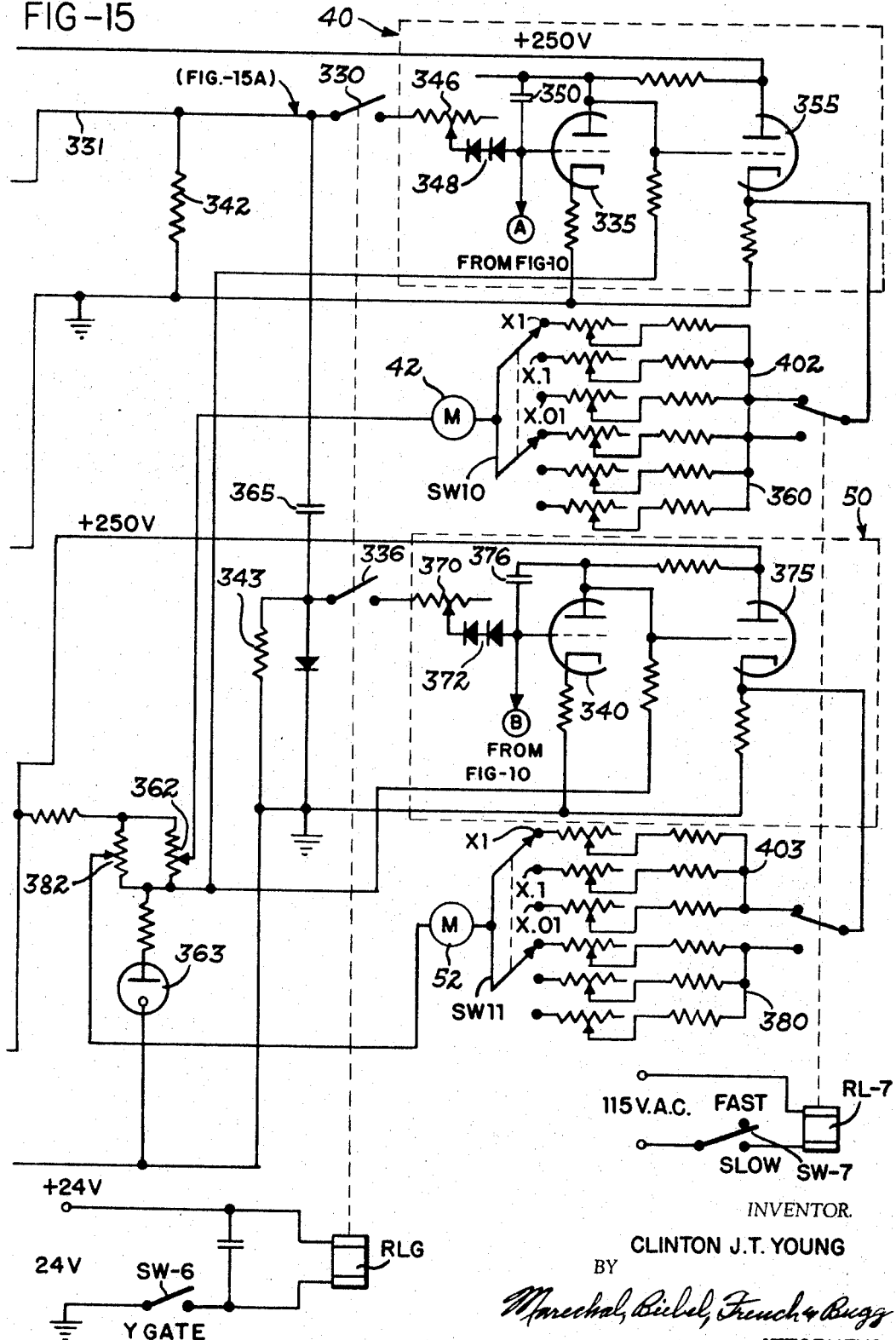

3,451,756
APPARATUS FOR MEASURING THE TRASH CONTENT OF RAW COTTON
Clinton J. T. Young, Alexandria, Va., assignor to Outlook Engineering Corporation, Alexandria, Va., a corporation of Virginia
Filed Apr. 23, 1964, Ser. No. 361,958
Int. Cl. G01n 21/16, 21/32, 21/48
U.S. Cl. 356—237     15 Claims

ABSTRACT OF THE DISCLOSURE

An optical-electronic instrument for measuring the trash content of raw cotton includes a scanner and a photo-electric transducer. All areas darker than a preselected threshold level are counted as cotton trash and all trash areas that pass this threshold are given the same weight, irrespective of variations in darkness. Discrimination between trash and background is made on the basis of absolute reflectivity rather than contrast. Standardization areas are included in each scan and compared with interscan black to form reference levels used for internally stabilizing the output. A calibration area is scanned prior to traverse for calibrating the output of instrument.

---

This invention relates to an inspection instrument and method, and more particularly to an instrument and method for inspecting a sample surface and evaluating information contained on the surface as variations in the reflectivity characteristics of the sample.

The apparatus and method of this invention have particular applicability to the scanning of a sample of material such as may be placed against an inspection window, and for providing an indication of the amount of an optically discernible or recognizable characteristic within the sample area. An example of this is the measurement of the trash content in a fixed sample of cotton. However, the teachings of this invention may also be applied to the measurement and indication of the characteristic of a constantly moving sample or web of material.

The preferred embodiment described herein is in terms of a cotton trash meter which measures the amount of leaf, stem and other foreign material or trash in a sample of cotton. Thus, the system is described in terms of measuring an optically discernible characteristic of decreased reflectivity as compared to the remainder of the area, although the teachings herein may be applied to the recognition of a characteristic of greater reflectivity.

The apparatus is provided with an inspection window against which the material to be inspected, such as cotton, is placed. The machine control preferably requires that the material be placed against the window under sufficient force to compress the material free of voids which may otherwise be falsely recognized as trash. To this end, the apparatus includes a sensing switch arrangement which signals or initiates the scanning operation and read-out only when sufficient force is applied by the material to the scanning window.

The invention includes scanning apparatus which preferably consists of a mechanical optical rapid scanning device which defines a scanning element and causes the element to move over a constantly changing small portion of the sample. The scanning apparatus is controlled in such a manner that the area of the window is effectively covered for the purpose of analysis in a cycle of operation. The invention includes an arrangement for effecting either normal or fast scans depending upon whether the entire area is to be covered or whether a statisical sampling alone is desired.

One such scanning mechanism which is particularly suited for use as the scanning device of this invention consists of the mechanical optical scanner described and claimed in the copending application of Young filed concurrently herewith Ser. No. 362,102. Such scanning device actuates a photoelectric transducer in accordance with the reflectivity characteristic of the element of the scan. However, it is within the scope of this invention to employ a television camera tube or other type of flying spot or image scanning devices.

The invention further includes apparatus and method for establishing an internal standard of reflectivity comparison which results in an instrument that is substantially free of the effects of warm-up drift, sensitivity changes, and voltage fluctuations. The internal standard employs a comparison of interscan black with the response derived from an area of known reflectivity. This standardizing area is preferably positioned so as to be repetitively scanned by the scanning system throughout the cycle of operation. Such area may consist of a scanned strip positioned adjacent the window which is scanned with each transverse movement of the flying spot.

The signals derived from the internal standard area and that derived from the interscan black are used in this invention to provide an AGC voltage for stabilizing the gain of an amplifier. Also, the interscan black signal is employed to form a basis of comparison in a threshold circuit so that the characteristics are recognized according to their absolute reflectivity and not according to their comparative reflectivity with the remainder of the sample. In this manner, accurate standardization of the instrument and evaluation of the samples are made possible.

The electronic circuit further includes an area integrator which continuously stores signals of the desired characteristic, such as trash, which signals have all been made equal to one another in signal strength, differing only in duration. The area integrator operates a meter which reads directly in percent of total area occupied by the recognized characteristic.

The apparatus also preferably includes a count integrator which provides a direct indication of the number of times which the scanning spot encounters the characteristic being searched. Thus, the count integrator provides a relative indication of the number of areas having the reflective characteristic being searched.

It is therefore an important object of this invention to provide an indication of the area or the number of optically discernible portions within a sample of material, or an indication of both the area and number.

Another important object of this invention is the provision of an inspection instrument and method for measuring the amount of areas in a sample which differ materially from the remainder of the sample, which measurement is based upon the absolute reflectivity of the measured area.

A further object of this invention is the provision of apparatus and method for measuring the number of times that a scanning spot encounters a significant difference in reflectivity characteristics, thus obtaining a relative indication of the number of areas in a sample which are significantly different in reflection from the rest of the sample.

A further object of this invention is the provision of apparatus including a threshold adjustment by which the sensitivity and response of the system may be accurately adjusted in accordance with the absolute reflectivity as distinguished from the degree of contrast of the character being searched from its background.

A still further object of this invention is the provision of an inspection instrument which includes a plurality of scan rates.

A still further object of this invention is the provision of an inspection instrument which is operated in response to a predetermined force of the material being scanned against a scanning window to assure the elimination of voids in the material which might otherwise be erroneously indicated in the instrument read-out.

Another object of this invention is the provision of an inspection instrument and method which utilizes an internal standard of reflectivity for the purpose of developing a control voltage for stabilizing the instrument and reducing the effects of sensitivity changes, drift in the source light or in the photomultiplier tube and the like.

Other objects and advantages of the invention will be apparent from the following description, the accompanying drawings, and the appended claims.

In the drawings:

FIG. 1 is an isometric view of an inspection instrument constructed according to this invention, with the lower portion of the cabinet being broken away;

FIG. 2 is a block diagram of the instrument of FIG. 1;

FIG. 3 is a plan view of the scanning window assembly, with the top of the cabinet being shown as broken away to expose the details of the window mounting arrangement;

FIG. 4 is an enlarged partially broken away longitudinal section of the scanning window assembly taken generally along the line 4—4 of FIG. 3;

FIG. 5 is an enlarged transverse section of the window assembly taken along the line 5—5 of FIG. 3;

FIG. 6 is a plan view of the bottom surface of the scanning window;

FIG. 7 is a somewhat diagrammatic view of the scanner and X gate generator;

FIG. 8 is a partially broken away plan view of the generator portion of FIG. 7;

FIG. 10 is a schematic diagram of the programmer; and

FIGS. 11–15 are respectively electric schematic diagrams of the electric circuits of the invention which, when assembled according to the diagram of FIG. 10, form a complete electrical schematic, and which include circuits as follows:

Figure 15A:
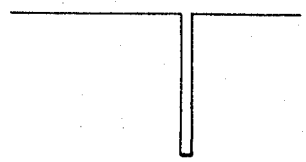

FIG. 11—AGC amplifier and threshold;
FIG. 12—signal amplifier, AGC controlled;
FIG. 13—amplifier equalizer;
FIG. 14—X gate generator amplifier and signal level meter;
FIG. 15—area and count integrators and meters.

FIGS. 11a, 11b, 12a, 13a, 13b, 13c, 13d and 15a are respectively wave form drawings of a typical signal as it appears at different locations within the electric circuits of FIGS. 11–15.

*General description*

Referring to the figures of the drawings which illustrate a preferred embodiment of the invention, an inspection instrument constructed according to the invention is shown in FIG. 1 as being mounted in a suitable cabinet 10 having a top 12 forming a working surface 13. On the surface 13 of the top 10 is mounted a control and instrument case 15 which includes a control panel 16 containing the instrument meters and controls which will be described in connection with the detailed description of the wiring diagram.

The top 12 also contains a scanning window assembly indicated generally at 20 in FIG. 1 against which a sample to be scanned is placed for inspection by the instrument. The window assembly 20 preferably includes means for initiating the automatic operation of the scanning and read-out mechanism, for indicating the amount or extent of a particular optically discernible character-istic as determined by a particular significant difference in reflectivity from that of the remainder of the area scanned.

Reference may be had to FIG. 2 for a general understanding of the major components and their functions which comprise the inspection instrument as a whole, as a general understanding of the operation of the instrument is believed to be helpful before proceeding to the description of the individual components and circuits. Accordingly, FIG. 2 shows diagrammatically a sample 22 placed in superimposed position on the window assembly 20.

Although the specific embodiment is described in terms of an instrument for measuring trash in cotton, it is to be understood that the invention is not limited to such a specific application and that the teachings herein may be applied to the recognition and measurement of any optically discernible characteristic in a sample or sampled area. As an example, color may be recognized by the employment of a suitable filter. Differences in reflectivity or in direction of reflection may also be recognized and signaled or measured. Additionally, the teachings of this invention may be applied to a constantly moving sample or sampled area, such as the inspection of a moving web of material, as distinguished from a fixed sample.

Since the detailed description is in terms of an inspection instrument for measuring the amount of trash in a sample of cotton, it may be assumed that the sample 22 represents a quantity of raw cotton fibers which may be pressed, as by hand, onto the exposed upper surface of the window assembly 20. When sufficient force is applied to the cotton to compress it against the window assembly substantially free of voids, a scanner 25 is caused to operate in a cycle of operation to make one full traverse of the area of the window assembly.

The scanner 25, which is somewhat diagrammatically illustrated in FIG. 7, is preferably constructed according to the teachings of the copending application of Young, filed concurrently herewith, although vidiocons or other types of scanners which sample a constantly changing small element and provide an electrical signal of the reflective characteristics of the element, may be employed.

A programmer 26 is provided for the purpose of controlling the operation of the scanner 25 to cause a traverse motor to operate defining a cycle of operation in response to the application of the sample 22 to the window assembly 20. The scanner 25 is preferably provided with or coupled to a signal generating device forming a gate signal in the fast direction of scan designated by the letter X in FIG. 6. This is shown as the X-gate generator 30 in FIG. 2 and in greater detail in FIG. 7. A further function of the scanner is to develop a signal in the slow direction of scan, designated by the letter Y in FIG. 6, for the purpose of providing a suitable Y gating signal to the instrument circuits.

The electrical output of the scanner 25, which may be derived in a suitable phototransducer, represents the instantaneous reflectivity of the area being scanned, and is applied to an initial amplifier 32. The inspection instrument also includes special internal provision for concurrently generating in the transducer a standardizing signal on a time sharing basis, and this is applied for the control of an automatic gain control circuit 33 which controls the gain of the amplifier 32. In this manner, the sensitivity of the system is stabilized independent of the affects of warm up drift, scanning light source variations, changes in component sensitivity, and the like.

The output of the amplifier 32 is applied through a threshold circuit 34 to a second amplifier 35. The purpose of the threshold circuit 34 is to pass only signals which have values which lie within the range represented by the response which results with the scanning of trash, and thus to exclude the portion of the signal representing the remaining area. Thus, the threshold circuit 34 passes to the amplifier 35 all signals which exceed a certain value.

The amplifier 35 has the particular function of equalizing the amplitude of all of the signals which represent trash. Therefore, any trash signal, regardless of the amount which it exceeds a threshold level and regardless of duration (trash area), is amplified to a common level with all other trash signals of the sample. The X-gate signal is here to limit the signal to that generated during the part of the X-scan that will fall within the transparent part of the window assembly 20.

The output of the amplifier 35 is applied through the Y-gate control 36 into an area integrator 40 which accumulates the signals throughout the cycle of operation as defined by the Y-gate 36 and the programmer 26, and applies the accumulated total to a meter 42. The meter 42, by suitable choice of sensitivity and meter scale, may be read directly as a fraction of the sample area occupied by trash.

The output of the amplifier 35 is also applied to an equalizer 45. The purpose of the equalizer 45 is to derive from the trash signals coming from the amplifier 35 uniform pulses so that each signal is not only of common amplitude, but also of common duration, regardless of the areas occupied by the trash. This signal is also applied through the Y-gate 36 to a count integrator 50 which may be constructed similarly to the integrator 40, and applied to a meter 52. The meter 52 may be calibrated to read directly the number of times which the scanning element has encountered areas of trash within the sample 22 thus providing a relative indication of the number of trash spots in the sample.

The system may also be provided with a repeat control 55 for the purpose of causing a repeat scanning of the sample 22 without the necessity for moving the sample. Thus, the invention includes provision by which repeated scannings may be made for the purpose of taking an average and obtaining the most accurate indication possible within the tolerances of the instrument.

*Scanning window assembly*

The scanning window assembly 20 is shown in FIGS. 3–5 as including an outer frame 60 which is mounted beneath a suitable prepared opening within the instrument top 12. The frame 60 supports a two-piece inner glass supporting frame consisting of a lower window frame portion 61 and an upper frame portion 62 on a pair of hinges 63 and 64. The frame portions 61 and 62 are shown in FIGS. 4 and 5 in the lowered or depressed position such as would be the case when a sample is placed against the window 70. The downward motion is limited by the upper part 62 of the window frame against the outer frame 60. The inner frame parts 61 and 62 are biased to the upper position by a leaf-spring 66 and by the internal springs of a pair of switches SW8 and SW9. The switches SW8 and SW9 may be mounted on suitable switch brackets 68 to the lower surface of the outer frame 60.

The frame 61 supports the glass window 70. The window 70 has an upper surface slightly elevated above the surface 13 for receiving the sample to be scanned by reason of the glass thickness. The lower surface of the window 70 is masked as shown in FIG. 6 to define a transparent sample scanning area 72 which is traversed in the X and Y directions of the scan. The pressing of sample 22 down against the window 70 to operate the switches SW8 and SW9 causes the material of the sample to be compressed substantially free of voids for accurate measurements of trash content.

Since the scanner described in connection herewith results in curved scans, the area 72 is curved at the ends thereof. The exposed lower surface of the window 70 is prepared with neutral grey reflecting areas 74, 75 at each end of the scan in the slow direction of scan. The window 70 is further provided with standardizing parallel bands or areas 76 and 77 of equal width and preferably of relatively high reflectivity which are traversed by each scan in the X-direction.

*Scanner*

The scanner is shown in FIG. 7 as being of the mechanical-optical type which includes a rotating mirror structure 80 driven by a scanning motor 81. The structure 80 has a plurality of inclined reflective surfaces 82. The scan element is defined by a source 83 and is projected by a suitable lens 84 through a mask 85 onto one of the rotating mirror surfaces, where it is reflected outwardly to an inclined mirror 86, and from there, upwardly and focused on the upper plane of the window assembly 20.

As described in the above-mentioned copending application of Young, the scanner 25 maintains the focus of a scan element as it traverses in the X-direction across the window 70 from the band 76, across the clear window area 72, and then across the band 77. Movement in the Y-direction, which may require several seconds depending on the desired rate of scan, may be effected by suitably mounting the scanner 25 on a carriage driven by a lead screw and controlled by limit switches. The details of the control for such a drive unit will be described further in connection with the detailed description of the programmer 26 of FIG. 9.

The characteristic instantaneous reflectivity throughout the scan is converted to an electric signal by a photomultiplier tube 90. A stationary image of the constantly moving scan element is directed to the tube 90 through the active mirror surface 82 by lens 92. Thus, the output of the photomultiplier tube 90 is an indication of the reflective characteristic of the surface or sample at the element illuminated by the source 83, as applied through the lens 84 and rotating mirror structure 80.

As a specific example, the scanner 25 may define, a scanning spot of .005 inch in diameter with a linear speed of about two thousand inches per second. The rate of scanning in the Y-direction may be such as completely to fill the area 72. However, it is within the scope of this invention to provide a rapid scan in this direction so that a fraction, such as for example one-fourth, of the area is covered, for a statistical analysis, such as by scanning every fourth line over the scan length in the Y-direction.

*X-gate generator (mechanical)*

The signal from the photomultiplying tube 90 includes a representation of the standardizing areas 76 and 77, as well as a representation of the instantaneous reflectivity throughout each line of scan across the open area 72 of the window 70. Since the areas 76 and 77 are lighter than the sample it is not necessary to gate them out except to remove the shadow effect at the edge of these areas which otherwise would be included in the measurement. An arrangement for this purpose is shown in FIGS. 7 and 8 as including a hub 94 mounted for rotation on a shaft 95, which may be the same shaft upon which the mirror structure 80 is mounted. Thus, the hub 94 and shaft 95 turn in synchronism with the reflecting surfaces 82 and with the scanning sequence generated thereby.

A pair of disks 96 and 97 may be mounted on the hub 94 and each provided with slots 98 forming identical sectors 100 in the periphery thereof. Two disks are provided so that the relative angular position may be adjusted by the screws 101, to define the angular extent of the opaque sector areas 100 between slots. This area is thus made to coincide with the position of the scanning element on the area 72 by suitably angularly positioning the combined disks 96 and 97 on the hub 94.

The signal generating means responsive to the positions of the sections 100 include a lamp 105 received within a slotted holder 106. The lamp 105 illuminates a small aperture 107 into the slot 108 through which the disk sectors rotate. A photocell 110 is also positioned within the holder 106 and is responsive to the illumination at the aperture 107 as moulded by the sectors 100 so that its resistance increases sharply during each passage of one of the sectors 100 past the aperture 107 signaling the extent of the X-gate as defined as that equal to or slightly less than the curved X-dimension of the scanned window area 72.

*Traverse assembly*

Figure 9:
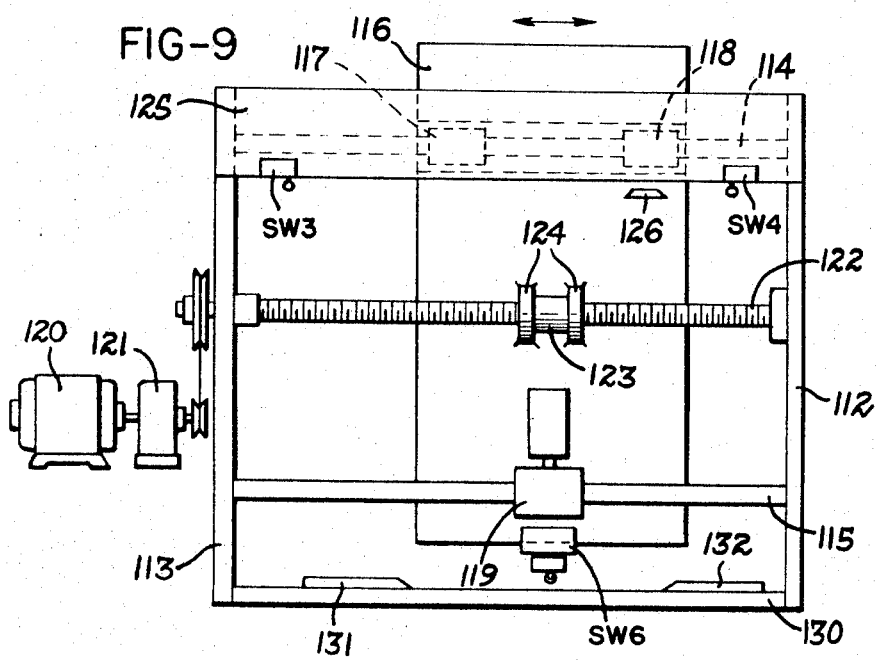
FIG. 9 is a view in elevation of the traverse assembly.

The means for supporting the scanner and lens system and for moving the scanner in the Y-direction in a cycle of operation is shown in FIG. 9 as including a pair of side rails 112 and 113 which may form an integral part of the frame of the machine. A pair of spaced guide rods or tubes 114 and 115 extend between the rails and support a platform 116 which may be the foundation casting for the scanner. The platform 116 is shown in FIG. 9 as being viewed from the side, and is mounted on the rods 114 and 115 by ball bushings. Two ball bushings 117 and 118 are provided on the rod 104 and a single ball bushing 119 is on the rod 115.

Means for moving the platform 116 in the Y-direction to effect a traverse of the window 70 includes a traverse motor 120 which is connected through a controllable speed changing or selecting mechanism 121 to drive a lead screw 122 rotatably mounted between the rails 112 and 113. A driving nut 123 is mounted on the lead screw between a pair of apertured bosses 124 extending from the platform 116 in rigid or fixed spaced apart relation.

Control switch means for the traverse motor 120 includes SW3 and SW4 which are mounted in spaced apart relation on a frame member 125 extending between the rails 112 and 113. The limit switches SW3 and SW4 are shown in FIG. 10 as being single pole, single-throw, normally open switches which are closed by contact with a depending cam plate 126 carried on the platform 116. Accordingly, the switches SW3 and SW4 provide a signal indicating that the platform 116 has reached one of its limits of travel in the Y-direction. These limits are such as to assure that the traverse begins and ends in one of the neutral gray areas 84 or 75 at the opposite ends of the inspection window.

Means for generating a Y-gate signal includes a Y-gate switch SW6 mounted beneath the platform 116 for movement therewith. A cross frame member 130 extending between the side rails 113, 114 carries a pair of spaced apart cam plates 131 and 132 which, with the switch SW6, define the extent of the Y-gate. The cam plates 131 and 132 are adjustable on the member 130 to permit the adjustment of the extent of the Y-gate in relation to the area 72, which may be somewhat less than the Y-extent of the area 72.

*Programmer 26*

The programmer circuit, shown in FIG. 10, provides the means by which the traverse motor 120 is controlled in a cycle of operation. The two motor control relays consist of relays RL3 and RL4 which, when operated, energize the traverse motor 120 to move the platform 116 and cam plate 126 respectively toward the motor control switches SW3 and SW4. Thus, it will be seen that relay RL3 includes a pair of holding contacts RL3a, and motor control contacts RL3b, c and d. The motor control relay RL4 includes corresponding holding and motor control contacts RL4a–d connected to cause the operation of the traverse motor in the reverse direction of rotation as compared to the corresponding contact of relay RL3.

The selection between the motor control relays, defining the direction of travel of the traverse motor, is effected by the contacts of a latching relay RL5. The latching relay has a pair of separately energizable operating coils RL5A and RL5B each of which may be energized momentarily to effect the transfer of the associated switch contacts, which then remain in position until reversed electrically. The relay coil RL5A is connected for operation through switch SW3 and, similarly, coil RL5B is energized through limit switch SW4.

The relay coils of the latching relays are designed to operate upon a pulse of current rather than a steady current. Accordingly, a current storing capacitor 133 is provided in series with the switch SW3 and ground. The capacitor charges through coil RL5A to limit the current flow to a pulse sufficient to operate the latching relay. The operation of relay coil RL5A causes all of the relay contacts of relay RL5 to move to the right away from the coil as shown. Relay coil RL5B is energized through switch SW4 and a capacitor 134 to limit the current to a pulse.

The latching relay includes two sets of contacts which select between the motor control relays RL3 and RL4. The first set of these contacts is designated at 135 and selectively applies the power supply to the respective holding contacts RL3a and RL4a, of the relays RL3 and RL4. The second of these contacts 139 and 140, respectively, discharge the capacitors 133 and 134 by grounding.

The operation of the traverse motor 120 is initiated by the window switch SW8, which is normally open, but is closed when the window is depressed, as explained in connection with the description of FIGS. 3–5. The closing of switch SW8 applies a pulse of current through a capacitor 142 and a diode 143 to the lead 138 for the energization of one of the relays RL3 and RL4, depending upon the position of the latching relay which is related to the position of the platform 116. The traverse motor 120 will then be operated to move the platform 116 from its resting position at one normal limit of its rtavel to its opposite position, until the closing of one of the limit switches SW3 or SW4 transfers the latching relay thus breaking the holding circuit to the motor control relay RL3 or RL4. The depression of the window also opens a normally closed switch SW9. The opening of switch SW9 removes a ground circuit to the integrators of FIG. 15 by releasing relay RL2.

The programmer includes means for effecting repeated scans of the traverse motor 120 without the necessity for moving the sample on the window 70. By means of a repeated cycle of operation, the operator may make a number of readings of the sample in order to obtain an average reading. For this purpose, a repeat push button switch SW12 is provided having two sets of contacts SW12a and SW12b. The switch contacts SW12a, when depressed, charge a capacitor 145. When the switch is released, the charge of the capacitor is applied through an isolation diode 146 to the lead 138, effecting the pull-in of one of the relays RL3 and RL4 in the manner of switch SW8. Also, the depression of switch SW12 operates the clearing relay RL2 thus grounding and clearing the integrators. The release of the button releases relay RL2 placing the integrators in a state of readiness for a new reading. Resistors 147 and 148 are arranged to remove the charge respectively from capacitors 145 and 142 upon the opening of the associated switches SW8, SW12A.

*AGC controlled amplifier 32*

The output of the photomultiplying tube 90 is a negative signal which is applied to the grid of a cathode follower tube 150. The output of the cathode follower 150 is coupled to the grid of a remote cutoff pentode 152 through a capacitor 153 and lead 154. The pentode 152 is shown in FIG. 12 as forming the first amplifying stage of the AGC controlled amplifier 32.

A typical wave form of the signal from the multiplier 90 for one fast line of scan, as applied to the first amplifier stage, is shown in somewhat idealized form in FIG. 11a. The wave form of FIG. 11a may be considered to be an oscilloscope display which is traced from left to right. At angular positions of the rotating mirror structure 80 outside of the useful scan, the light from the source 83 is trapped so that substantially no light reaches the photomultiplier 90. This is known as inter-scan black, and the output from the tube 90 corresponds to almost perfect black. This output for a single line of scan is shown as the positive plateau 160 at the beginning of the scan and the corresponding plateau 162 at the end of the scan.

The scanning spot then encounters the strip 76 on the window 70 along the edge of the area 72. In the preferred embodiment of this invention, the strips 76 and 77 are formed with high-reflectivity, such as white, resulting in a large negative signal as shown at 165 on FIG. 11a.

The scanning spot then traverses the sample 22 exposed at the window area 72 and a somewhat irregular signal results according to the varying reflectivity of the sample. This varying reflectivity may result, in part, from the varying compactness where the sample is cotton, and the corresponding output from the tube 90 is somewhat idealized in form at 166 in FIG. 11a. Actually, the line 166 may be quite irregular according to small variations in the cotton reflectivity. This is the background characteristic from which the trash is distinguished by the system.

It is assumed that at one point in this scan, a piece of dark trash is encountered. This causes a positive excursion 170, the height of which depends upon the darkness of the trash, and the duration of which depends upon the linear length of trash piece lying in the path of the given line of scan.

At the end of the scanned area 72, the second calibration or white strip 77 is encountered, causing another negative pulse 172, similar in magnitude and duration to the pulse 165. After that, the inter-scan black brings the signal back to the high level at 162 at which the pattern began. The corresponding wave forms resulting by this single exemplary line of scan are shown at various points throughout the electrical schematic in order to illustrate the electrical modifications and conditions which are imposed upon the basic wave form illustrated in FIG. 11a.

The signal in the form shown in FIG. 11a is applied to a remote cutoff, AGC controlled first amplifier tube 152, forming a part of the amplifier 32. The inverted form of the signal is applied through a coupling capacitor 180 to the grid of a second tube 182, similar to the tube 152, and forming a second AGC controlled amplifying stage within the amplifier 32.

There are two reasons for employing two initial amplifiers (which may be considered as preamplifier stages). First the stages of amplification within the amplifier 32 increase the sharpness of discrimination between light and dark in the following threshold circuit 34. Second, the tubes 152 and 182 provide a convenient place at which to apply automatic gain control. It will be understood by those skilled in the art that the need for automatic gain control is greatest where an unstable light source is used, such as a concentrated zirconium arc lamp. Automatic gain control is also useful to reduce the need for adjustment during warm up, which can result from a photomultiplier's decrease in efficiency with increasing temperature.

The signal output from the tube 182 is applied on lead 183 through a coupling capacitor 184 to the threshold circuit 34 shown in FIG. 11. It may be desirable to display a voltage corresponding to the amplitude of signal from the photomultiplier tube 90 on a meter as an indication of the sensitivity of the system prior to a traverse while scanning at the neutral gray areas 74 or 75 at each end of the window 70. Prior to a traverse of the sample, the scanning motor 81 is started and operated continuously so that one of the areas 74 or 75 is continuously scanned. The signal resulting at the tube 90 is applied through a lead 190 to a cathode follower tube 192, shown in the left-hand portion of FIG. 14. The output at the cathode of tube 192 may be applied through a coupling capacitor 183 to a closed loop circuit including a pair of diodes 184, 185 and a meter 200. The capacitor is connected to the junction of the diodes with the result that the meter 200 reads in proportion to the peak-to-peak signal. The signal strength may then be adjusted prior to traverse, such as by adjusting the photomultiplier supply voltage, to hold the initial signal at or near a constant amplitude.

*AGC circuit 33*

The voltage difference between the dark plateaus 160 and 162, and the strong negative voltages 165 and 172 caused by the standardizing strips 76 and 77 of the window 70 is substantially constant and is independent of the reflectivity of the sample at the window. By developing a voltage proportional to the peak-to-peak voltage of this wave, an AGC signal is obtained that is dependent upon illumination and photomultiplier gain, but is independent of the characteristics of the sample being read.

A signal is taken off the plate of the first amplifier 152 by a lead 205 and is applied through a coupling capacitor 206 to the grid of an AGC amplifying dual triode 210 (FIG. 11). The signal thus applied is essentially an amplified inverted form of the signal shown in FIG. 11a. The first half of the dual triode 210 operates as a low-gain phase inverter supplying an inverted form of the signal to the second half of the triode. The gain of the first triode stage and accordingly the sensitivity of the AGC amplification, may be adjusted by a potentiometer 212 in the grid input circuit.

The output of the AGC amplifier is applied by a lead 214 to an AGC detector circuit in FIG. 12 forming a part of the AGC circuit 33 and shown for convenience in FIG. 12. As will be seen in FIG. 12, an adjustable voltage dividing circuit between the +250 volt and ground is provided by a pair of fixed resistors 216 and 217 and a rheostat 218. A filter capacitor 220 is connected between the junction of the resistors 216, 217 and ground. The amplified signal on the lead 214 from the AGC amplifier is applied through a coupling capacitor 222 to the junction between a pair of diodes 224 and 226. The diodes 224 operates to clamp the top of the wave, that is the portions 165 and 172 of the inverted wave form of FIG. 11a, to a positive reference voltage, as determinend by the rheostat 218.

The wave form from which the AGC voltage is derived is thus clamped to the internal reference and is applied through the diode 226 to the AGC lead 228. A part of the AGC voltage which is developed is applied through a potentiometer 230 and a resistor 231 to control the bias on the grid of the amplifier 182. A part is also applied through fixed resistor 232 to the grid of the first amplifier 152. Capacitors 234 and 236 together with the resistors 237, 238 and 240 determined the time constant of the AGC signal. The AGC signal is therefore dependent upon the difference in the response of the photomultiplier tube to the standardizing areas and interscan black, and is not dependent upon the relative reflectivity of the sample.

In other words, the AGC signal is derived from a signal including portions which are both above and below the levels at which discriminations of trash signals are to be made. The gain of the amplifier 32 is dependent upon the voltage difference between the known or standardizing areas 76 and 77 and the interscan black.

It should be understood that the above results may be attained in other ways, such as by adjusting the photomultiplier supply voltage or other gain control or a voltage divider in servo fashion, or by controlling the output of the lamp source 83 by clamping the top or the bottom of the stabilizing wave to a definite voltage that fixes the wave in level as well as in amplitude so that all parts of the signal are stabilized at their proper instantaneous voltages. The principle described above of stabilizing a signal wave that includes at least two reference levels may be applied even if the signal being evaluated extends beyond the range of references. In such case, however, a gating means would be required to make the standardizing action dependent only on the reference levels outside of the range of the signal eliminates this problem.

Threshold 34

As noted above, the output from the amplifier 32 is applied to the threshold circuit 34 through the grid of a cathode follower tube section 240. The DC level of this signal is clamped to interscan black by diode 242 through a threshold control 245. The control 245 provides an adjustable regulated voltage taken off the junction of resistors 246 and 247 as controlled by a gas discharge regulator tube 250.

The wave form applied to the grid of the cathode follower tube 240 is substantially an amplification of the output of the photomultiplier tube 90. The clamping diode 242 clamps the most positive portion of the signal, that is the interscan black portions 160 and 162, to an adjustable threshold voltage determined by the position of the potentiometer 245. This signal and voltage is applied to the cathode of a triode 260 through an isolation diode 261.

The signal into the threshold circuit 34 from the amplifier tube 182 (FIG. 12) on the lead 183 may be coupled capacitively to the cathode follower. Since the instrument distinguishes trash on the basis of absolute reflectivity rather than contrast from background, it is desirable to refer the signal to the adjustable voltage which determines the threshold level on the signal. This may be done by clamping either of the extremes of the signal to the adjustable voltage. The interscan black has been clamped by the diode 242 because it contains less of the statistical noise. Since the interscan black is clamped to the adjustable voltage, the effective threshold will be at a definite voltage difference from it for any one setting of the potentiometer 245, and therefore will define a definite reflectivity difference from black.

The cathode of the triode 260 is connected to ground through a pentode 265. The triode 260 and the pentode 265 form a discriminator circuit which passes only the portions of the signal which are above a predetermined threshold, determined by the setting of the control 254 and the grid bias of the triode 260. The pentode has low direct current impedance to carry the triode's cathode current, but has high impedance for the signal frequencies, so that the signals applied to the cathode of the tube 260 are not lost to ground by this path.

The triode 260 is normally operated in a saturated condition, as determined by the voltage of the grid. The grid voltage is held fixed through a voltage regulator circuit including a resistor 268 and a gas discharge regulator tube 270. The grid is decoupled to ground through a capacitor 272.

Figure 11B:
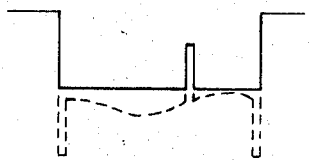

In the triode 260, as long as the cathode is below grid voltage, the tube remains saturated and variations in the cathode voltage have no effect upon the plate potential. After the signal applied to the cathode causes the cathode to rise above the grid voltage, then the grid begins to exercise control and the plate current decreases with a concurrent rise in plate voltage. In this manner, the threshold circuit effectively removes the signals representing the white areas 76 and 77, and the intermediate signal representing the cotton or background characteristic, leaving only the interscan black signals and the trash signals, as shown in FIG. 11b.

The wave form output of the tube 260 may have a total height in the order of ten volts. If this signal, as shown by the broken lines in FIG. 13a, is capacitively coupled to the next amplifier, the top of the wave will clamp to the cathode level, and the part containing the trash signal appearing above threshold will be so far negative as to be nearly lost. To prevent this and to avoid the instability of direct-current coupling, it is desirable to slice or clip off all of the wave more than a small amount, in the order of one volt above the base of the wave. This result is shown by the full lines of FIG. 13a and is effected by applying the signal from the plate of the tube 260 along a lead 275 to a slicer diode 276 (FIG. 13). The slicer diode 276 is biased at a fixed voltage as determined by the voltage divider resistors 277 and 278. A decoupling capacitor 280 leads from the voltage divider to ground. The slicer diode 276 passes only the lower portion of the wave form shown in FIG. 13a, and applies this through a coupling capacitor 282 to the grid of a gating amplifier tube 284. A diode 285 between the capacitor 282 and ground clamps the bottom portion of the signal of FIG. 13a at ground potential.

X-gate generator 30

The amplifier 35 (FIG. 13) is a desirable point at which to introduce the X-gate signal. To this point, the circuit cannot yet distinguish between the trash pulse that should be measured and the interscan black which should not be measured Distinction is required since the desired pulses and the interscan black are in the same voltage range.

The X-gate generator is shown in FIG. 14 as including the lamp 105 and the photocell 110 which were previously described in connection with the FIGS. 7 and 8. It would be possible to time the X-gate from a salient feature of the signal wave itself, such as by using a multivibrator or some other suitable square wave generator to determine the gate length and, if necessary, including delay means to time the opening of the gate. However, stability is easier to achieve where the gate is timed directly by the scanner, as described in connection with FIGS. 7 and 8. Thus, referring to FIG. 14, the power supply for the photodiode 110 includes voltage proportioning resistors 292 and 293, a decoupling capacitor 294, and a current limiting resistor 295. The signal of the photodiode is capacitively coupled directly to the grid of an amplifier tube 300. Since the X-gate is defined by the sectors 100 of the disks 96 and 97 which block the light to the diode 110, the X-gate is in the form of a positive square pulse.

The output of the amplifier 300 is applied to a further triode section 304 through a capacitor 305 for the purpose of effectively inverting the wave to its original positive pulse form for application by the lead 290 to the second control grid of the tube 284 in FIG. 13. The tube 304 has its plate connected to ground through a load resistor 306 (FIG. 13) and its cathode connected to minus 105 volts. Thus, when the tube 304 conducts, its plate goes negative with respect to ground, and the gating tube 284 is cut off. However, during the X-gate the tube 304 is cut off and the second control grid of the gating tube 284 is at or near ground potential, permitting the tube 284 to pass the clipped signal applied thereto, such as shown in FIG. 13a.

Amplifier 35

Figure 13B:
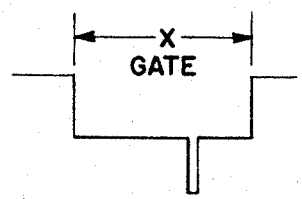
Figure 13A:
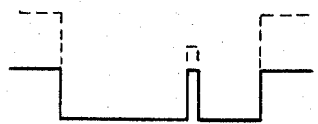
Figure 13C:
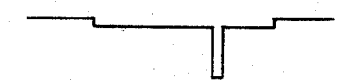

The output at the plate of gating tube 284 is shown in FIG. 13b as a wave in which there is a large voltage range above the part containing the desired intelligence. The background variation caused by the gate is in the direction opposite to the pulse representing trash. In order to avoid having the desired part of the wave far below cut-off of the next grid, the upper part of the wave is cut or clipped off to obtain a signal as shown in FIG. 13c.

The clipper forms part of the direct current coupling between the tube 284 and the following amplifying tube 310. The signal from the plate of the tube 284 is applied to a pair of series connected Zener diodes 315 and 316 which form a voltage dividing circuit to minus 105 volts through fixed resistors 317, 319, and a potentiometer 318. The grid of the amplifier tube 310 is connected at reference level at the wiper of the potentiometer 318. The Zener diodes 315 and 316 lower the DC level of the signal applied to the grid of tube 310 by a constant amount without lowering the signal amplitude.

A clipper diode 320 is connected between the input grid of the tube 310 and ground, and conducts to ground any portion of the signal at the grid which is more positive than ground. Accordingly, the potentiometer 318 is adjusted to remove the unwanted upper portion of the total wave to that indicated in FIG. 13c, so that the desired signal is not obscured.

Figure 13D:
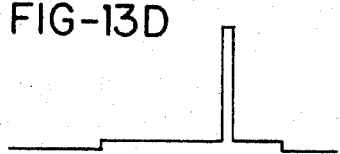

The output at the plate of tube 310 is a signal having a wave form as shown in FIG. 13d. This signal is so large that the base line of the signal is biased below the cutoff of the following amplifying stage consisting of tube 325 and the positive pulses saturate the tube 325. Therefore, an additional stage of amplification, by the tube 325, results in a steady high voltage which is interrupted only by strong negative pulses representing trash or such other characteristic as is being measured. This is shown at 15a forming the input to the integrator circuits of FIG. 15. Grid bias is established by a tap on a potentiometer 326 connecting the grid circuit to a source of negative voltage through an isolation diode 327. The diode 327 prevents the positive pulses from being lost at the grid.

The amplifier tube 325 accordingly comprises means for amplifying all of the signals of the desired characteristic to a common value, irrespective of the initial amplitude of the pulse, and irrespective of duration, since the negative portion of the wave at FIG. 13d applied to the grid of the tube 325 is below cut-off and the positive portion is above the saturation point causing the flow of grid current. Therefore, the output of the amplifier 35 consists of pulses of constant amplitude representing the characteristic being looked for, such as trash, with the length of these pulses representing the linear extent of the characteristic within each single line of scan in the X-direction.

Y-gate 36

The input to the integrators is a convenient place at which to insert the Y-gate. The Y-gate could be applied in the same way as described for the X-gate. However, since the time involved in scanning in the Y-direction is considerably longer, a mechanical switch may be used. Accordingly, the switch SW6 which has been described in connection with FIG. 9, is shown electrically in FIG. 15 as being connected to operate a Y-gate relay RL6. The Y-gate relay includes a first pair of switch contacts 330 in the lead 331 from the plate of the amplifier 325. The switch contacts 330 connect the output of the amplifier stage 325 to the area integrator 40 including a one-tube integrator 335. The relay RL6 also includes a second pair of switch contacts 336 which operate to connect the out put of the amplifier 325 to the count integrator 50 including the tube 340.

The Y-gate relay switches 330 and 336 are positioned between the grids of the integrator tubes and their respective grid return resistors 342 and 343 and therefore isolate the grids when open. By isolating the grids from ground except while the signals are being admitted, backward leakage is eliminated providing high integrator stability so that a one-tube integrator will hold readings substantially unchanged for periods of length adequate for the purpose of the invention.

Integrators 40 and 50, equalizer 45

The grid of the area integrator tube 335 is connected to receive the signals through the switch 330, a variable resistor 346, and a pair of crystal diodes 348. The signal which is thus admitted is stored in a capacitor 350 throughout the scan in the Y-direction, and the pair of diodes 348 block the leakage or escape of the charge from the integrator capacitor 350 during the reading of the sample. Accordingly, the charge which has accumulated on the capacitor 350 at the conclusion of the scan is proportioned to the area occupied by the characteristic being examined and is applied to a cathode follower 355 to the area indicating meter 42 through selected ones of a group of proportioning resistors 360. The meter 42 may be made to read directly in the percent of the area occupied by the trash by selection of the resistors 360. A three-position ganged scale factor selector or range switch SW10 is provided for selecting the desired meter scale. The area meter 42 is connected to operate from a voltage reference including a meter balance potentiometer 362 and a regulator tube 363.

The invention further includes means for providing a relative indication of the number of pieces of trash within the sample area. The count integrator 50 is arranged to accumulate a charge representnig the number of times that the scanning spot has encountered trash particles. This may be accomplished in an integrator circuit identical to that described above provided that each pulse for each trash encounter is made of equal length. This condition may be effected by a suitable equalizer which may take any one of a number of forms, such as a one-shot multi-vibrator which is triggered by the leading edge of each pulse. However, it has been found that a simple differentiating circuit works quite well as the equalizer 45, causing each pulse received from the amplifier 325 to add substantially the same amount of charge to the count integrator regardless of the size of the piece of trash encountered. The differentiating circuit includes the coupling capacitor 365 connected to the lead 331 and the grid leak resistor 343, the time constant of which is such as to cause the desired differentiating action. Thus, the capacitor may have a value of 330 micromicrofarads and the resistor 343 a value of 3300 ohms.

The Y-gate relay switch 336 applies the differentiated signal through a variable resistor 370 and crystal diodes 372 to the grid of the count integrator tube 340. These signals are stored within the integrator capacitor 376, and the total signal level accumulated is applied by the tube 340 through a cathode follower 375 to the count meter 52. Similar proportioning resistors 380 are supplied together with a range selector switch SW11 for the meter 52. The meter 52 is connected for operation through a balance potentiometer 382 which is in parallel with the potentiometer 362, described above.

It may be desirable to obtain a final measurement that represents the average of several readings, for example four. This may be arranged by having the integrators not discharged before each reading until the required four traverses have been made. If the scale factors are changed so that each reading is one-fourth of that for a single reading, the readings on the meters 42 and 52 will then represent the average of four readings. The sample may be held in one position and the repeat button SW12 operated for successive scans, or it may be moved for each of the several readings. The latter may be desirable for obtaining an average of several areas on a given sample or for obtaining an average reading of several samples taken from a larger quantity of cotton.

The speed of traverse of the scanner in the Y-direction and the rate of the fast scans may be chosen in relationship to the spot size and the area to be covered. If the speed of traverse is such that the advance in the period from scan to scan equals the spot diameter, there will be complete coverage of the sample area with no overlapping. Slower traverse will give more or less repetition which may be desired in some applications. Faster traverse will give incomplete coverage.

For example, if the traverse causes an advance of four spot diameters in the same period, one-fourth of the area or one line in the space of four will be scanned. For measuring a random object, such as trash in cotton, a fast scan may provide a quantitative analysis which may be as good as that obtained with complete coverage and in a considerably shorter time.

Thus, the invention includes means for changing the traverse speed in order to provide for fast traverse, and includes the mechanical speed selector mechanism 121 (FIG. 9), for changing the drive relationship between the traverse motor 120 and the platform 116. Also, a relay RL7 (FIG. 15) is provided for operation from a switch SW7 (FIG. 15) for selecting appropriate calibration resistor groups 402 and 403 for each of the area and count meters 42 and 52. The values of the calibration and multiplication resistors may be chosen by one skilled in the art to effect the desired change in meter sensitivity according to the change in traverse speed.

*Operation*

The operation of the individual parts of this invention is mainly self-evident from the foregoing description, in which the principle and operation of the components have been described. The high speed scanning motor 81 is started prior to traverse and allowed to come to speed, and the power supplies for the electronic circuits are turned on in the usual manner. This scanner, which is at rest at one or the other limit of traverse as defined by the switches SW3 or SW4 repetitively scans one of the neutral gray areas 75 at the ends of the window 70. An indication of the sensitivity of the system may then be had by observing the meter 200 and making whatever adjustments to the photomultiplier supply are deemed necessary for preliminary adjustment.

The placing of the sample against the window 70 and pressing, such as by hand, with sufficient force to cause the window to move against the spring 65 and the switches SW8 and SW9 causes the material to be compacted and presented to the window area 72 substantially without voids. The operation of the switch SW9 causes it to open, thus releasing relay RL2 (FIG. 10) and removing the ground from the integrators. The operation of switch SW8 causes it to close sending a pulse through the lead 138, as described above in connection with FIG. 10, effecting the initiation of one cycle of traverse by the motor 120.

The coincidence of the flying spot with the area 72 is signaled by the Y-gate switch SW6 which operates the Y-gate relay RL6, so that the signals of the desired characteristics are applied to the count and area integrators. The counting is completed when the switch SW6 is opened by contacting either of the cam plates at 31 or 32 and the total indication on the meters 42 and 52 remains undisturbed until the sample is removed. The removal of the sample causes the grounding of the integrators through the relay RL2 and the elimination of the stored information.

Throughout the scanning of the sample, the sensitivity of the system is controlled by the internal standards provided by the standardizing strips 76 and 77 and the signal representing interscan black. The AGC signal has been referred to the response at standardizing areas so that the response is related to the internal sensitivity of the system. The level of the trash signal is related to interscan black so that the characteristic is recognized by reason of its absolute reflectivity rather than the degree of contrast with the background characteristic.

The AGC controlled signal from the amplifier 32 is then applied to the threshold circuit 34 which provides the means for passing only the signals exceeding predetermined threshold. Since these signals are measured from interscan black they are compared with the threshold on the basis of absolute reflectivity instead of contrast from background. The invention is not limited to the recognition of areas of low reflectivity, and the threshold circuit 34 will pass high reflectivity signals if the signals are inverted.

The signal from the threshold 34 is applied to the amplifier 35 which includes the gating tube 284. The gate tube may therefore be considered as gating means which is connected to receive the signal from the threshold and is controlled by the gate generating means for passing only the signals resulting within the sample areas 72 in each line of fast scan. The amplifier 35 may further be considered as a means for amplifying the signals to a common value or valuation irrespective of derivation and may therefore be considered as an equalizer means.

The signals from the amplifier 35 are applied to the area and count integrators 40 and 50 through the Y-gate switch effected by the relay RL6. The integrators are, in effect, accumulators since they accumulate the signals over the gating period in the Y-direction and hold this information for presentation at the meters. Accordingly, the integrators 40 and 50 may be considered as including accumulator means (capacitors 350 and 376) and indicator means (meters 42 and 52) for presenting the accumulated total of the passed signals at the conclusion of the cycle of operation of the programmer. The scan factor or range selector switch SW11 may be adjusted to indicate the percent of the total area on the meter 42 and the number of times that scanning spot has encountered trash on the meter 52.

For certain purposes, fast scanning may be desirable, and this effected by operating the speed selecting mechanism 121 for changing the drive relationship and by operating switch SW7 for changing the scan factor of the resistors in the meter circuits. Also, additional scans either at fast or regular speed may be obtained by the operation of the repeat push button SW12, so that a repeated complete cycle of operation may be initiated resulting in a traverse in the opposite direction of the preceding traverse, without having to move the sample 22. If desired repeat scans may be effected in the normal manner by removing the force on the sample and by reapplying the force against the window assembly 20.

It will therefore be seen that this invention has provided a versatile inspection instrument which may be employed to provide a rapid and accurate indication of the occurrence of a recognizable characteristic in a sample of a given area, which area may either be moving or fixed. The invention further provides the method for determining the percent of area in a sample having a given reflectivity differing from that of the remainder of the sample. Although the instrument is particularly useful for the establishment and maintenance of cotton grades by the measurement of trash content, the utility of the invention is by no means limited to the specific example given, and the teachings herein may be applied by those skilled in the art to other systems for recognizing and measuring the occurrence of other optically discernible characteristics.

While the method herein described, and the form of apparatus for carrying this method into effect, constitute a preferred embodiment of the invention, it is to be understood that the invention is not limited to this precise method and form of apparatus, and that changes may be made therein without departing from the scope of the invention which is defined in the appended claims.

What is claimed is:

1. Apparatus responsive to the occurrence in an object of a characteristic which is optically distinguishable from the background, comprising:
   means forming an area of a fixed standard of reflectivity;
   scanning means including an optical to electrical transducer forming an instantaneous signal of a small changing portion of said object and of said area of fixed standard of reflectivity;
   automatic gain control means responsive to the output of said transducer occurring during scanning of said standard area;
   amplifier means controlled by said automatic gain control means connected to receive and amplify signals from said transducer;
   gating means passing only the portion of said transducer signal representing said object;
   discriminator means connected to pass only electric signals representing said optically discernible characteristics;
   and means for utilizing said signals of said characteristics.

2. An instrument responsive to the occurrence in an object of a characteristic which is optically distinguishable from the background, comprising:
- means establishing a fixed standard of comparatively high reflectivity included as a part of the area scanned;
- scanning means including a transducer repetitively forming an instantaneous signal of a small changing portion of the area of said object and of said fixed standard of reflectivity;
- automatic gain control means responsive to the difference in output of said transducer between said standard area and interscan black;
- amplifier means controlled by said automatic gain control means connected to receive signals from said transducer;
- signal gating means operable in synchronism with said scanner for passing only the portion of said transducer signal representing said object and removing the portion thereof representing said standard;
- threshold means connected to pass only electric signals representing said optically discernible characteristics;
- and integrator means for storing said signals of said characteristics.

3. An inspection instrument for measuring the extent of optically discernible characteristics in a sample of material comprising:
- scanner means operable in a cycle of operation to scan said material and developing an electric signal of a constantly changing small area of the material being scanned;
- means repetitively included by said scanning means forming a part of said instrument for establishing a standard of comparison resulting in a reference signal distinguishable from the signal which normally occurs when scanning said discernible characteristic;
- an AGC circuit connected to be responsive to said reference signal and providing an AGC voltage which is independent of the reflectivity of said sample;
- amplifier means stabilized by said AGC voltage for amplifying the signal from said scanner means;
- gating means for passing only the portion of said signal representing said sample;
- and integrator means connected to accumulate the passed signals throughout said cycle of operation including accumulator means and indicator means for presenting the accumulated total of passed signals at the conclusion of said cycle.

4. An inspection instrument for measuring the extent of an optically discernible characteristic from a background characteristic in a sample of material comprising:
- scanner means operable in a cycle of operation to scan said material and developing an electric signal of a constantly changing small area of the material being scanned;
- means repetitively included by said scanning means forming a part of said instrument for establishing a standard of comparison resulting in a reference signal distinguishable from the signals which occurs when scanning said discernible characteristic;
- an AGC circuit connected to be responsive to said reference signal and providing an AGC voltage independent of the reflectivity of said sample;
- amplifier means stabilized by said AGC voltage for amplifying the signal from said scanner means;
- means for discriminating signals of said discernible characteristic from said background characteristic;
- and integrator means connected to accumulate the signals of characteristic in a cycle of operation including indicator means for presenting the accumulated total of passed signals at the conclusion of said cycle.

5. The inspection instrument of claim 4 wherein said discriminating means includes a threshold control for passing only the electric signals which exceed a predetermined response level representing said discernible characteristic, and amplifying means connected to receive said signals from said gating means for amplifying each of said signals to saturation prior to said integrator means.

6. The inspection instrument of claim 4 wherein said discriminating means includes a threshold for passing only the electric signals which differ from the electric signal representing interscan black by less than a predetermined amount.

7. An inspection instrument for measuring the extent of an optically recognizable characteristic from a background characteristic in a sample of given area comprising:
- scanner means effecting rapid line scanning in an X-direction in excess of X-dimension of said sample area and having an electric output responsive to the presence of said recognizable characteristic in each line of scan;
- programmer means for causing said scanning means to traverse said sample in a cycle of operation in a Y-direction in excess of the Y-dimension of said sample area;
- means generating an X-gate signal with the coincidence of each line of scan in said X-direction with said sample area;
- amplifier means connected to receive said electric output;
- gate means connected to receive the signal from said amplifier means and controlled by said X-gate signal generating means for passing only signals resulting within said sample area;
- Y-gate means for passing only signals corresponding generally to the Y-dimension of said sample area;
- and integrator means for totalizing signals of said recognizable characteristic passing through said X- and Y-gate means.

8. An inspection instrument for measuring the extent of an optically recognizable characteristic from a background characteristic in a sample of given area comprising:
- scanner means effecting rapid line scanning in an X-direction in excess of X-dimension of said sample area and having an electric output responsive to the presence of said recognizable characteristic in each line of scan;
- a standardizing area adjacent said sample area included in the lines of scan;
- programmer means for causing said scanner to traverse said sample in a cycle of operation in a Y-direction;
- means generating an X-gate signal with the coincidence of each line of scan;
- amplifier means connected to receive said electric output;
- AGC means responsive to the difference in said scanner output between said standardizing area and interscan black and connected to control the gain of said amplifier means;
- gating means connected to receive the signal from said amplifier means and controlled by said X-gate signal generating means for passing signals resulting within said sample area and excluding said signals of said standardizing area;
- and integrator means for totalizing signals of said recognizable characteristic passing through said X-gate means.

9. An inspection instrument for measuring the extent of an optically recognizable characteristic from a background characteristic in a sample of given area comprising:
- scanner means effecting rapid line scanning in an X-direction and having an electric output responsive to the presence of said recognizable characteristic in each line of scan;
- programmer means for causing said scanner to traverse said sample in a Y-direction in excess of the Y-dimension of said sample area;

amplifier means connected to receive said electric output;

speed control means for said programmer means providing selection between slow traverse with substantially complete coverage of said sample area by scanner means and fast scan providing partial coverage of the whole of said area;

Y-gate means for passing only signals from said amplifier corresponding generally to the Y-dimension of said sample area;

integrator means for totalizing signals of said recognizable characteristic passing through said Y-gate means;

and indicator means connected to said integrator means including a range selector switch operable to select an indicator range correlated with the setting of said traverse speed control means.

10. An inspection instrument for measuring the extent of an optically recognizable characteristic from a background characteristic in a sample of given area comprising:

scanner means effecting rapid line scanning in an X-direction in excess of X-dimension of said sample area and having an electric output responsive to the presence of said recognizable characteristic in each line of scan;

programmer means for causing said scanner to traverse said sample in a Y-direction;

means generating an X-gate signal with the coincidence of each line of scan in said X-direction with said sample area;

amplifier means connected to receive said electric output;

gating means connected to receive the signal from said amplifier means and controlled by said X-gate generating means for passing only signals resulting within said sample area;

and means for utilizing the signals of said recognizable characteristic passing through said X-gate means.

11. An inspection instrument for measuring the extent of an optically discernible characteristic in a sample of material comprising:

scanner means operable in a cycle of operation to scan said material and develop an electric signal representing occurrences of said optically discernible characteristic in a constantly changing small area of the material being scanned;

means in said instrument repetitively included by said scanning means for establishing a standard of comparison resulting in a reference signal distinguishable from the signal which normally occurs when scanning said discernible characteristic;

circuit means responsive to said reference signal and providing a control signal which is independent of the optical response of said sample and connected to stabilize the response of said instrument;

amplifier means for amplifying the signal from said scanner means;

gating means for passing the portion of said signal representing said sample;

and means connected to utilize the passed signals throughout said cycle of operation.

12. A self-stabilized optical measuring instrument responsive to the occurrences in an object of optically distinguishable characteristics, comprising:

a photo-electric transducer operable to form an electrical signal of an object being measured;

means forming an optical reference;

scanner means applying a changing portion of said object to said transducer and further scanning said optical reference on a time-sharing basis with said object;

means separating the signal corresponding to said optical characteristics from the signal corresponding to said reference;

utilization means including amplifier means connected to receive the signal corresponding to said characteristics;

and gain control means connected to receive the signal corresponding to said reference and operable to control the sensitivity of said amplifier means for stabilizing said amplifier means in accordance with the level of said signal coresponding to said reference.

13. In an optical inspection instrument for indicating the occurrences of an optically discernible characteristic in a given field including an optical scanner and transducer forming an electrical signal representing the occurrences of such characteristic in said field and controllable amplifier means connected to receive said signal from said transducer to provide a useable indication of the occurrences of said characteristic;

the improvement in instrument stabilization and calibration comprising means defining a standard region of fixed optical characteristics adjacent said field which region is repetitively included by said scanner while scanning said field;

sensitivity control means responsive to the signal output from said scanner corresponding to said standard for controlling the sensitivity of said amplifier means;

a calibration area adjacent said field;

and programmer means for causing said scanner to scan said calibration area exclusively of said field providing a reference for adjusting the output of said amplifier means independently of said field.

14. The instrument of claim 12 in which said utilization means includes an integrator, and indicator means responsive to the relative percentage of said optical distinguished characteristic in said object.

15. The instrument of claim 12 in which said utilization means comprises a counter, and indicator means responsive to the number of occurrences of said optically distinguishable characteristic in said object.

References Cited

UNITED STATES PATENTS

| | | | |
|---|---|---|---|
| 3,142,719 | 7/1964 | Farr | 88—14 |
| 3,280,692 | 10/1966 | Milnes et al. | 88—14 |
| 3,056,033 | 9/1962 | Shepard | 250—220 |
| 3,264,480 | 8/1966 | Zuck et al. | 88—14 |

RONALD L. WIBERT, *Primary Examiner.*

ORVILLE B. CHEW II, *Assistant Examiner.*

U.S. Cl. X.R.

250—219; 356—212, 243